(12) United States Patent
Nakanishi et al.

(10) Patent No.: US 6,761,175 B2
(45) Date of Patent: Jul. 13, 2004

(54) SHEET TOBACCO

(75) Inventors: Yukio Nakanishi, Kanagawa (JP); Akinori Ota, Kanagawa (JP); Katsuhiko Kan, Tokyo (JP); Naohiko Shimono, Ibaraki (JP); Kiyotaka Kawai, Shiga (JP); Yoshisato Miyakoshi, Ibaraki (JP); Hiroaki Narita, Tokyo (JP); Toshiki Iijima, Tokyo (JP); Kouichi Hagiwara, Shiga (JP)

(73) Assignees: Japan Tobacco Inc., Tokyo (JP); Japan Vilene Company, Ltd., Tokyo (JP)

( * ) Notice: Subject to any disclaimer, the term of this patent is extended or adjusted under 35 U.S.C. 154(b) by 0 days.

(21) Appl. No.: 10/000,159

(22) Filed: Dec. 4, 2001

(65) Prior Publication Data

US 2002/0129826 A1 Sep. 19, 2002

Related U.S. Application Data

(63) Continuation of application No. PCT/JP00/03612, filed on Jun. 2, 2000.

(30) Foreign Application Priority Data

Jun. 4, 1999 (JP) .............................. 11-157934

(51) Int. Cl.[7] .............................................. A24B 15/12
(52) U.S. Cl. ...................... 131/354; 131/355; 131/353
(58) Field of Search ................................ 131/370, 350, 131/375, 371, 372, 373, 374, 354, 355, 357, 364, 353; 162/139

(56) References Cited

U.S. PATENT DOCUMENTS

| 3,025,860 | A | * | 3/1962 | Grossteinbeck et al. .... 131/140 |
| 3,459,195 | A | * | 8/1969 | Silberman ..................... 131/17 |
| 4,542,755 | A | | 9/1985 | Selke et al. |
| 4,768,527 | A | * | 9/1988 | Graves, Jr. .................. 131/375 |

FOREIGN PATENT DOCUMENTS

| JP | 48-44495 | 6/1973 |
| JP | 53-133700 | 11/1978 |
| JP | 61-52269 | 3/1986 |

* cited by examiner

Primary Examiner—Dionne A. Walls
(74) Attorney, Agent, or Firm—Birch, Stewart, Kolasch & Birch, LLP

(57) ABSTRACT

Sheet tobacco according to the present invention includes a carrier sheet made of nonwoven plant fibers, and a tobacco powder layer formed on the carrier sheet and containing a powder mixture of tobacco lamina powder and binder powder. In a sheet tobacco manufacturing process according to the present invention, a carrier sheet of plant fibers is formed by a nonwoven fabric production process, a tobacco powder layer is formed by spreading the powder mixture on the carrier sheet, and a cover sheet of plant fibers is optionally formed on the tobacco powder layer. Subsequently, the carrier sheet, the tobacco powder layer and the optical cover sheet are all together subjected to heating and pressing, thereby producing sheet tobacco with a two- or three-layer structure. The present invention also provides a manufacturing system for carrying out the sheet tobacco manufacturing process.

10 Claims, 11 Drawing Sheets

SHEET TOBACCO

This Application is a Continuation of PCT/JP00/03612 filed on Jun. 2, 2000.

TECHNICAL FIELD

The present invention relates to sheet tobacco used as a sort of shredded filler for cigarettes or filter cigarettes, and a process and system for manufacturing such sheet tobacco.

BACKGROUND ART

In general, sheet tobacco of this kind is produced by a rolling process, a papermaking process or a process using slurry as an intermediate. Each of these processes has its own merits and demerits; however, whichever process is employed, the sheet tobacco obtained has low expansion coefficient.

Examined Japanese Patent Publication (KOKOKU) No. 56-19225 discloses a process for manufacturing sheet tobacco with high expansion coefficient. This conventional process utilizes techniques for producing nonwoven fabric. Specifically, first, a sheet-like mat is formed using a fibrous tobacco material, and the formed mat is then impregnated with a liquid binder to obtain sheet tobacco.

To make use of the above techniques for producing nonwoven fabric, the tobacco material to be used must be of fibers longer than a certain length. Thus, only fibers obtained from stalks and stems of tobacco plant can be used as the tobacco material, and small pieces of shredded tobacco, fragments thereof, etc. produced in the process of manufacture of cigarettes or filter cigarettes practically cannot be reused as the tobacco material.

DISCLOSURE OF THE INVENTION

An object of the present invention is to provide sheet tobacco which can enhance the reusability of tobacco material and has high expansion coefficient, and a process and system for manufacturing such sheet tobacco.

Sheet tobacco according to the present invention has a two-layer structure including a tobacco powder layer and a carrier layer covering one side of the tobacco powder layer and made of nonwoven plant fibers, the tobacco powder layer containing a tobacco powder material and a binder.

The sheet tobacco of the present invention may further include a cover layer. The cover layer is made of nonwoven plant fibers and covers the other side of the tobacco powder layer. In this case, the sheet tobacco has a three-layer structure wherein the tobacco powder layer is sandwiched between the carrier layer and the cover layer.

The carrier layer and the cover layer serve to increase not only the expansion coefficient of the sheet tobacco but the mechanical strength of same. As the powder material of the tobacco powder layer, fine powder which is obtained from small pieces of shredded tobacco and fragments thereof produced in the process of manufacture of cigarettes or filter cigarettes can be used. The sheet tobacco of the present invention can therefore greatly enhance the reusability of the tobacco material.

Preferably, the tobacco powder layer has a basis weight of 30 to 200 g/m$^2$, and the carrier layer and the cover layer each have a basis weight of 3 to 50 g/m$^2$. Also, the content ratio of the binder, for example, cornstarch, to the tobacco powder material in the tobacco powder layer is preferably not greater than 15% by weight. The layers having such basis weights and the binder content impart sufficient original smoking taste and flavor to the sheet tobacco.

The binder is preferably used not only to bind the powder material of the tobacco powder layer, but also to bind together the plant fibers used in the carrier layer and/or the cover layer. In this case, no other binder needs to be used for the plant fibers, making it possible to reduce the binder content in the sheet tobacco.

The sheet tobacco according to the present invention may further include a layer of tobacco particles. The tobacco particle layer contains particles of tobacco stems and laminas and is sandwiched between the carrier layer and the tobacco powder layer or between the tobacco powder layer and the cover layer.

A sheet tobacco manufacturing process according to the present invention comprises: a preparing step of preparing a carrier sheet of nonwoven plant fibers; a forming step of spreading a tobacco powder material on the carrier sheet to form a tobacco powder layer covering one side of the carrier sheet; an adding step of adding a binder to the tobacco powder layer during or after the forming step; and a binding step of binding the powder material in the tobacco powder layer as well as the tobacco powder layer and the carrier sheet to each other by means of the binder.

With the above manufacturing process, sheet tobacco with a two-layer structure is obtained which includes the tobacco powder layer and the carrier sheet as the carrier layer.

Preferably, the carrier sheet is formed by a dry nonwoven fabric production process, and the tobacco powder layer is formed on the carrier sheet continuously following the formation of the carrier sheet. This procedure permits the binder in the tobacco powder layer to be used also to bind together the plant fibers in the carrier sheet.

Since the carrier sheet is formed by a dry process as mentioned above, the quantity of water used in the formation of the carrier sheet is small. Accordingly, the cost of drying the carrier sheet can be reduced, and also the carrier sheet can be prevented from being deteriorated in smoking taste and flavor due to the drying.

After the tobacco powder layer is formed, a cover sheet made of nonwoven plant fibers, like the carrier sheet, may be formed on the tobacco powder layer. In this case, the sheet tobacco has a three-layer structure wherein the tobacco powder layer is sandwiched between the carrier sheet and the cover sheet.

Preferably, the cover sheet on the tobacco powder layer also is formed by a dry nonwoven fabric production process continuously following the formation of the tobacco powder layer.

In the aforementioned binding step, the binder added to the tobacco powder layer serves to bind together the plant fibers in the carrier sheet and the cover sheet. Thus, no other binder is required for the carrier sheet or the cover sheet.

Specifically, the aforementioned adding step is performed by adding a binder of powder or liquid form to the tobacco powder layer in the process of formation of the tobacco powder layer. Preferably, the binder contains cornstarch as a main component. Where the binder used is in powder form, the tobacco powder layer and the carrier sheet, as well as the cover sheet, are made to be impregnated with a solvent for the binder, for example, water, prior to the binding step.

The binding step is carried out by pressing the two-layer sheet tobacco constituted by the tobacco powder layer and the carrier sheet or the three-layer sheet tobacco constituted by the tobacco powder layer, the carrier sheet and the cover sheet with heat applied thereto. In the process of the binding step, the binder binds together the powder material in the tobacco powder layer, binds the tobacco powder layer and the carrier sheet to each other, and also binds the tobacco powder layer and the cover sheet to each other. More specifically, in the case where the binder is in powder form, the binder dissolves in the solvent, forming a binder liquid. The binder liquid infiltrates also into the carrier sheet and the cover sheet, and when heated, the solvent of the binder liquid evaporates, so that the plant fibers are bound together by the binder.

The manufacturing process of the present invention may further comprise the step of forming a tobacco particle layer between the carrier sheet and the tobacco powder layer or between the tobacco powder layer and the cover sheet. The tobacco particle layer is made of particles of tobacco stems and laminas.

A sheet tobacco manufacturing system according to the present invention comprises: an endless net conveyor traveling in one direction; an upstream-side forming device for forming a carrier sheet of nonwoven plant fibers on the net conveyor; a powder spreading device for spreading a tobacco powder material on the carrier sheet to form a tobacco powder layer covering the carrier sheet; and a pressing device for heating and pressing the carrier sheet and the tobacco powder layer.

Preferably, a spraying device is arranged on an upstream side of the upstream-side forming device as viewed in the traveling direction of the net conveyor. The spraying device wets in advance the net conveyor with a predetermined liquid, to facilitate the peeling of the sheet tobacco from the net conveyor.

The manufacturing system may further comprise a downstream-side forming device for forming the cover sheet. The downstream-side forming device includes a fiber spreading unit arranged above the net conveyor for spreading plant fibers toward the net conveyor, a mesh conveyor arranged between the fiber spreading unit and the net conveyor, the mesh conveyor sucking thereon the plant fibers spread from the fiber spreading unit to form a cover sheet and transporting the cover sheet toward the net conveyor, and peeling means for peeling the cover sheet from the mesh conveyor to allow the cover sheet on the mesh conveyor to be transferred onto the tobacco powder layer.

BEST MODE OF CARRYING OUT THE INVENTION

Figure 1:
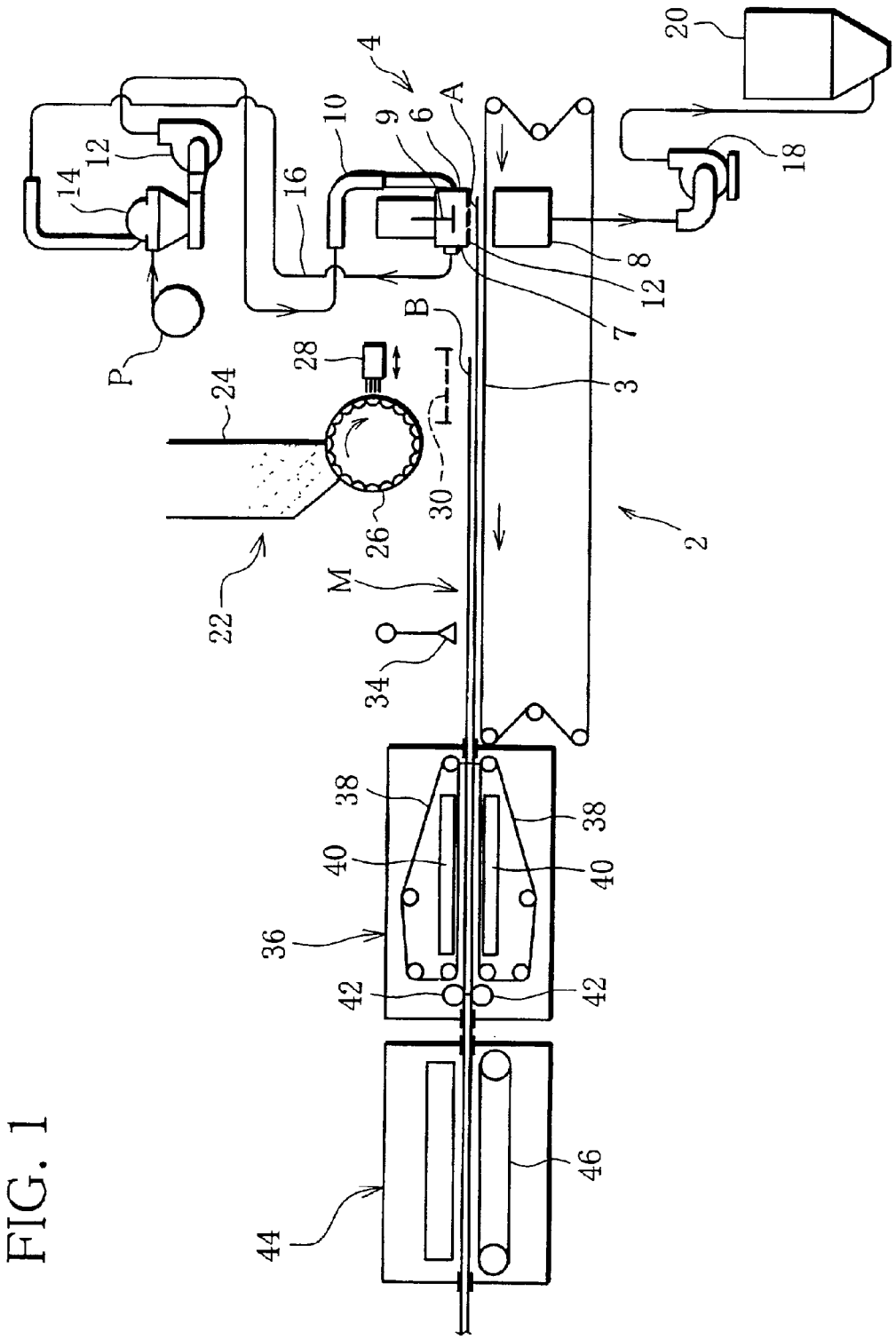
FIG. 1 is a schematic view showing a manufacturing system according to a first embodiment.

FIG. 1 schematically illustrates a manufacturing system according to a first embodiment for carrying out a sheet tobacco manufacturing process.

The manufacturing system includes an endless net conveyor 2. The net conveyor 2 has a net surface 3 traveling from right to left, as viewed in FIG. 1, and the net surface 3 passes a pulp layer deposition device 4. The layer deposition device 4 spreads plant fibers uniformly on the net surface 3 of the net conveyor 2, whereby a web of plant fibers, that is, a carrier sheet A, is formed on the net surface 3. More specifically, the layer deposition device 4 includes a fiber spreading unit 6 arranged above the net conveyor 2 and a suction box 8 arranged below the net surface 3, and the net surface 3 passes between the fiber spreading unit 6 and the suction box 8.

The fiber spreading unit 6 is connected through a pipe 10 and a fan 12 to an opening machine 14. The opening machine 14 coarsely crushes wood pulp P. The crushed fibers are transported from the opening machine 14 toward the fiber spreading unit 6 by means of the fan 12. The fiber spreading unit 6 has a chamber 7 opening to the net surface 3, and the fibers transported by the fan 12 are fed into the chamber 7. Rotatable agitating blades 9 are arranged in the chamber 7, and a fine mesh screen 11 is attached to the open end of the chamber 7.

The fibers supplied to the chamber 7 are agitated by the rotation of the agitating blades 9 while at the same time are discharged uniformly to the net surface 3 of the net conveyor 2 through the fine mesh screen 11 under the influence of suction by the suction box 8. Consequently, the discharged fibers are uniformly deposited on the net surface 3, thus forming the carrier sheet A. The carrier sheet A formed in this manner travels with the net surface 3. The fibers have an average length of about 2 mm, and the carrier sheet A has a basis weight of 3 to 50 g/m$^2$, for example, 12 g/m$^2$.

The chamber 7 is connected to the opening machine 14 also through a return pipe 16, and the suction box 8 is connected to a bag filter 20 through a suction fan 18.

Figure 2:
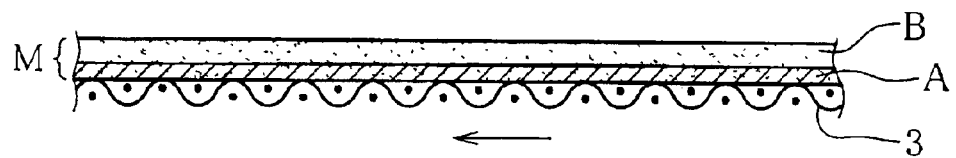
FIG. 2 is a view showing a state of a mat with a two-layer structure just after being formed in the system of FIG. 1.

A powder spreading device 22 is arranged above the net surface 3 on a downstream side of the pulp layer deposition device 4. There are various types of powder spreading device, and in this embodiment, the powder spreading device 22 includes a hopper 24, a roll 26 having a wire wound around an outer peripheral surface thereof, a vibrating brush 28, and a vibrating sieve 30. The hopper 24 stores a powder mixture therein. Specifically, the powder mixture includes mainly powder of tobacco laminas admixed with powder of cornstarch as a binder. As the roll 26 is rotated, the powder mixture in the hopper 24 transfers to the roll 26 and drops down toward the vibrating sieve 30. The powder mixture then passes through the vibrating sieve 30 and is spread uniformly over the carrier sheet A on the net surface 3. Immediately after passing under the powder spreading device 22, therefore, the carrier sheet A has a tobacco powder layer B of the powder mixture formed thereon, as shown in FIG. 2. As a consequence, a two-layer mat M having the carrier sheet A and the tobacco powder layer B is formed on the net conveyor 2.

The tobacco powder layer B has a basis weight of 30 to 200 g/m$^2$, for example, 88 g/m$^2$. Also, the proportion of the binder powder to the lamina powder in the powder mixture stored in the hopper 24 is not greater than 17% by weight. More specifically, the powder mixture consists of 91 wt % lamina powder and 9 wt % binder powder, and the average particle size of the lamina powder and the binder powder is preferably 10 µm to 500 µm.

Figure 3:
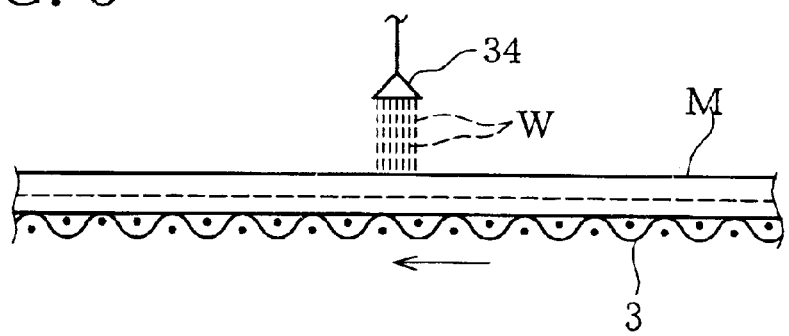
FIG. 3 is a view illustrating spraying of the mat of FIG. 2 with water.

An array of spray nozzles 34 is arranged above the net conveyor 2 on a downstream side of the powder spreading device 22. As shown in FIG. 3, the spray nozzles 34 spray a solvent for the binder powder, for example, water W, uniformly onto the mat M. The quantity of water sprayed in this case is 20 to 70 wt %, preferably 40 wt %, with respect to the mat M. Specifically, water is sprayed on the mat M at a rate of 40 g/m$^2$.

Accordingly, after passing under the spray nozzle array 34, the mat M, that is, the tobacco powder layer B and the carrier sheet A are uniformly impregnated with water.

Figure 4:
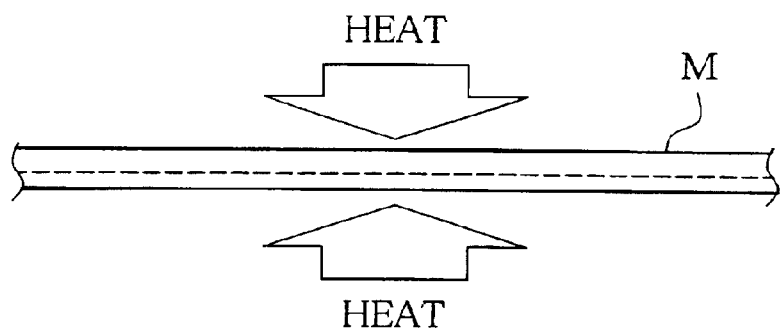
FIG. 4 is a view illustrating heating of the mat of FIG. 2.
Figure 5:
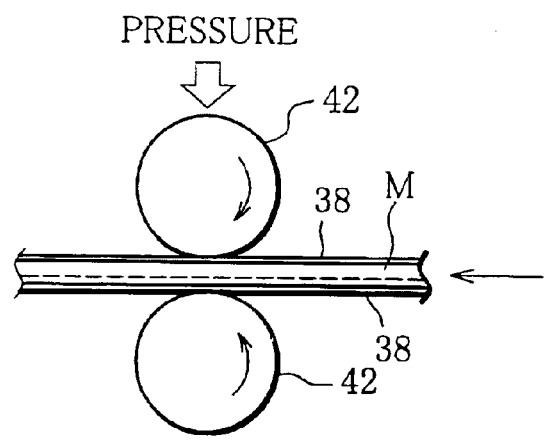
FIG. 5 is a view illustrating pressing of the mat of FIG. 2.

Subsequently, the mat M is introduced from the net conveyor 2 into a pressing device 36. The pressing device 36 has a pair of heat-resistant belt conveyors 38, and a transport path for the mat M is defined between the belt conveyors 38. The mat M delivered from the net conveyor 2 enters the transport path from an inlet thereof and is transported by the upper and lower belt conveyors 38 while being held therebetween. Heaters 40 are arranged inside the respective belt conveyors 38 and heat the mat M from above and below, as shown in FIG. 4, up to a temperature of 50 to 150° C., for example, 120° C. As a result, the water in the mat M evaporates. Further, upper and lower press rollers 42 are rotatably arranged at a location just short of an outlet of the transport path, and press the mat M through the belt conveyors 38, as shown in FIG. 5. A pressure applied to the mat M is 1 to 10 kg/cm$^2$, for example, 5 kg/cm$^2$.

As the mat M is subjected to the heating and pressing as mentioned above, the binder powder becomes pasty and the pasty binder uniformly infiltrates not only into the tobacco powder layer B but also into the carrier sheet A. Consequently, the binder binds together the lamina particles in the tobacco powder layer B, and also binds together the tobacco powder layer B and the carrier sheet A as well as the plant fibers in the carrier sheet A.

Subsequently, the mat M is guided from the pressing device 36 into a far infrared dryer 44 of air circulation type, for example. The dryer 44 also has a belt conveyor 46 for receiving the mat M transferred thereto. As the mat M is transported by the belt conveyor 46, the water content of the mat M is reduced to 5 to 20 wt %, for example, 11 wt %.

Figure 6:
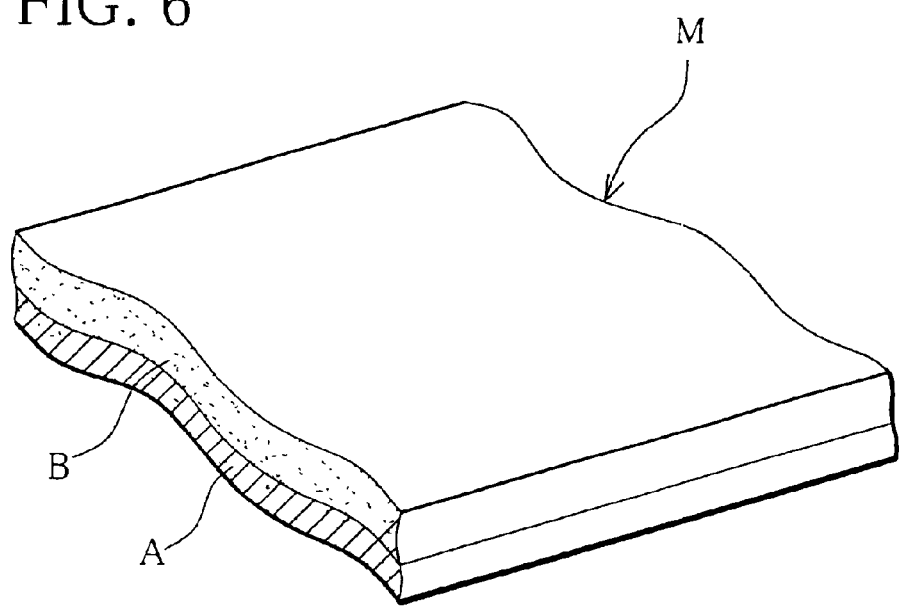
FIG. 6 is a partly broken perspective view of produced sheet tobacco having a two-layer structure.

Thus, the mat M is passed through the dryer 44, whereupon sheet tobacco as shown in FIG. 6 is obtained. The sheet tobacco has a two-layer structure wherein the tobacco powder layer B is formed on the nonwoven carrier sheet A.

The two-layer sheet tobacco shown in FIG. 6 has the below-mentioned values as its physical properties.

| | |
|---|---|
| Weight: | 100 g/m$^3$ |
| Tensile strength: | 4.9 N/15 mm width |
| Expansion coefficient: | 3.51 cc/g |
| Apparent density: | 0.732 g/cm$^3$ |
| Water resistance time: | 48 min. |
| Nicotine content: | 1.19 D.M. % |

Figure 7:
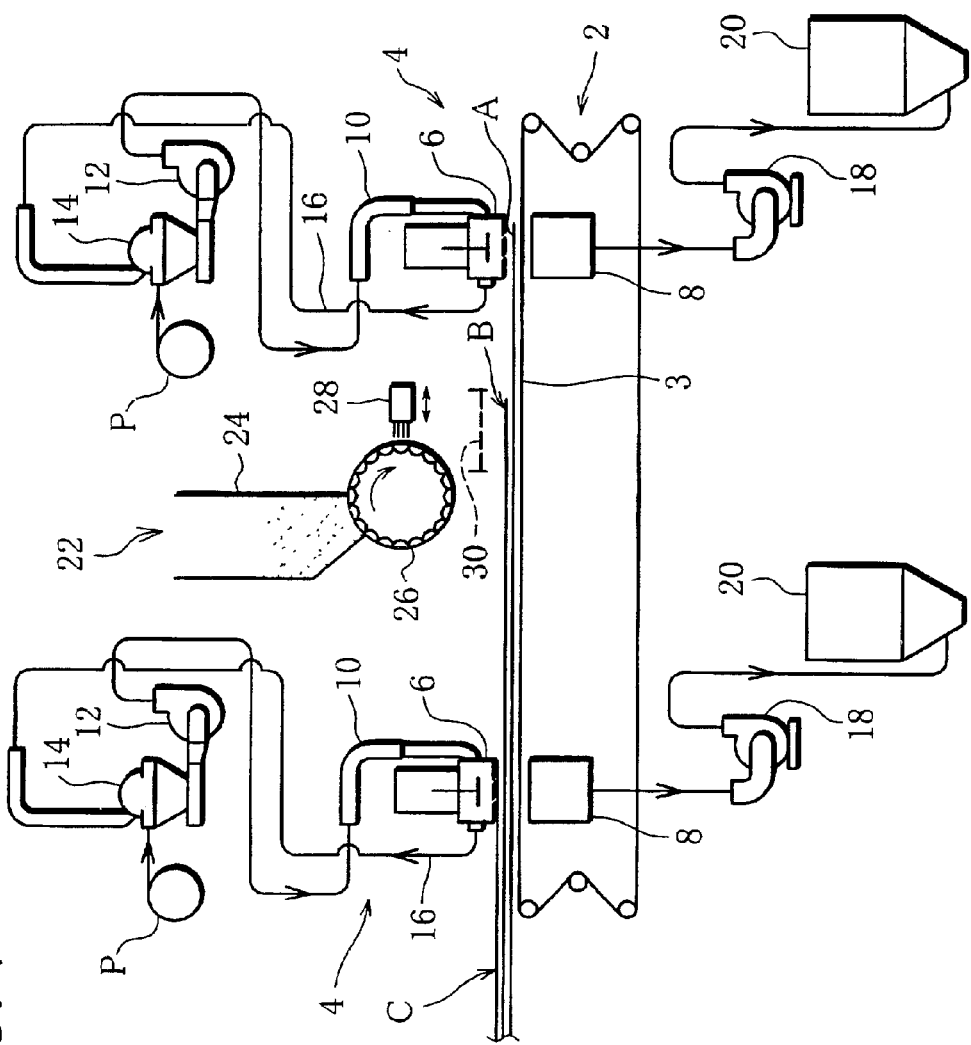
FIG. 7 is a schematic view showing part of a manufacturing system according to a second embodiment.

FIG. 7 shows part of a manufacturing system according to a second embodiment for carrying out a sheet tobacco manufacturing process.

Figure 8:
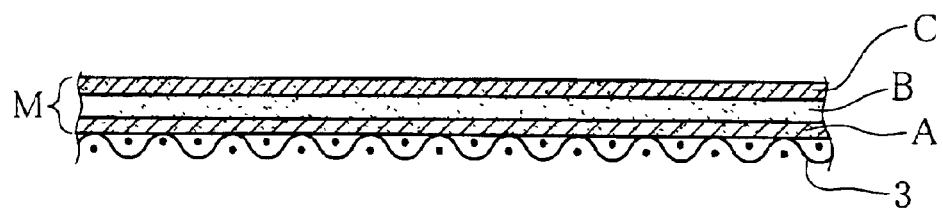
FIG. 8 is a view showing a state of a mat with a three-layer structure just after being formed in the system shown in FIG. 7.
Figure 9:
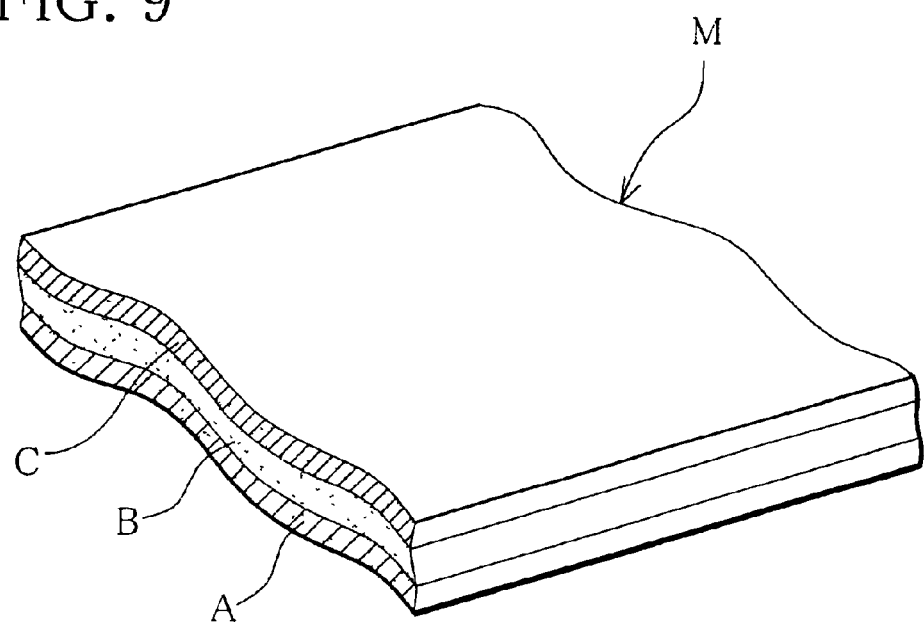
FIG. 9 is a partly broken perspective view of produced sheet tobacco having a three-layer structure.

The manufacturing system of the second embodiment has two pulp layer deposition devices 4 between which the powder spreading device 22 is located. With this manufacturing system, a cover sheet C can be additionally formed on the mat M, that is, on the tobacco powder layer B. The cover sheet C is a pulp-deposited sheet similar to the carrier sheet A. Accordingly, after passing under the downstream-side layer deposition device 4, the mat M has a three-layer structure wherein the tobacco powder layer B is sandwiched between the carrier sheet A and the cover sheet C, as shown in FIGS. 8 and 9.

In the case of the mat M with a three-layer structure, the basis weight of each of the carrier sheet A and the cover sheet C is 3 to 50 g/m$^2$, for example, 9 g/m$^2$, and the basis weight of the tobacco powder layer B is 30 to 200 g/m$^2$, for example, 132 g/m$^2$. The weight ratio of the binder powder to the lamina powder in the powder mixture is 10 to 90. Also, the array of the spray nozzles 34 sprays water W in an amount of 20 to 70 wt %, for example, 40 wt % with respect to the weight of the mat M. In this case, the quantity of water sprayed on the mat M is 52 g/m$^2$.

Further, the mat M is heated in the pressing device 36 at a temperature of 50 to 150° C., for example, 120° C., and is pressed under a pressure of 1 to 10 kg/cm$^2$, for example, 5 kg/cm$^2$.

The sheet tobacco with a three-layer structure has the following values as its physical properties:

| | |
|---|---|
| Weight: | 100 g/m$^3$ |
| Tensile strength: | 5.4 N/15 mm width |
| Expansion coefficient: | 4.1 cc/g |
| Apparent density: | 0.744 g/cm$^3$ |
| Water resistance time: | 59.6 min. |
| Nicotine content: | 1.23 D.M. % |

Figure 10:
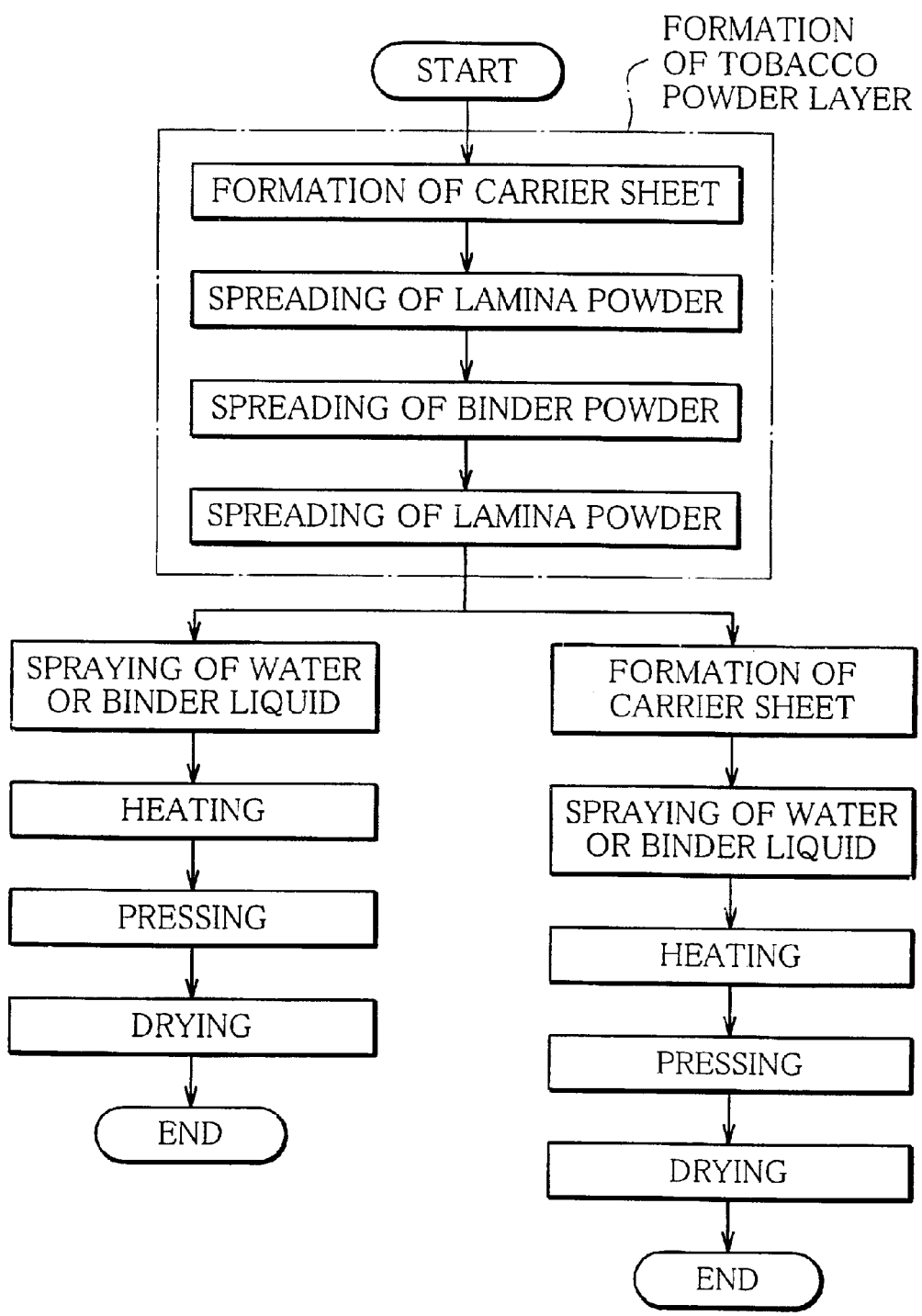
FIG. 10 is a flowchart illustrating a process for manufacturing sheet tobacco with a two- or three-layer structure.

Referring now to FIG. 10, there are shown processes for manufacturing sheet tobacco by using the manufacturing systems shown in FIGS. 1 and 7. The lower part of the flowchart branches into two, the left branch indicating the manufacture of the two-layer sheet tobacco, and the right branch indicating the manufacture of the three-layer sheet tobacco.

As seen from FIG. 10, the tobacco powder layer B may be formed by spreading the lamina powder and the binder powder separately over the carrier sheet A, or by alternately spreading the lamina powder and the binder powder.

In the case where the powder spreading device 22 spreads the lamina powder alone on the carrier sheet A, a binder liquid in which cornstarch is dissolved as the binder may be sprayed from the spray nozzle array 34.

Also, the carrier sheet A and the cover sheet C may each be formed in advance by depositing pulp and stored in the form of a roll. In this case, the tobacco powder layer B is formed on the carrier sheet A delivered from the roll. Where the three-layer mat M is to be produced, the cover sheet C delivered from the roll is lapped over the tobacco powder layer B. Also, in cases where the carrier sheet A and the cover sheet C are formed beforehand, the sheets A and C may each be formed by a wet nonwoven fabric production process.

As the binder, not only cornstarch but various other binders used in the tobacco manufacturing industry may be used. Further, the tobacco powder layer may be admixed with other substances than the binder, such as combustion adjuster, inorganic filler, humectant, water resistance modifier and flavoring material, so that the quality, flavor and taste of the sheet tobacco can be adjusted.

The plant fibers for forming the carrier sheet and the cover sheet may be admixed with fibers obtained from tobacco stalks and stems.

Figure 11:
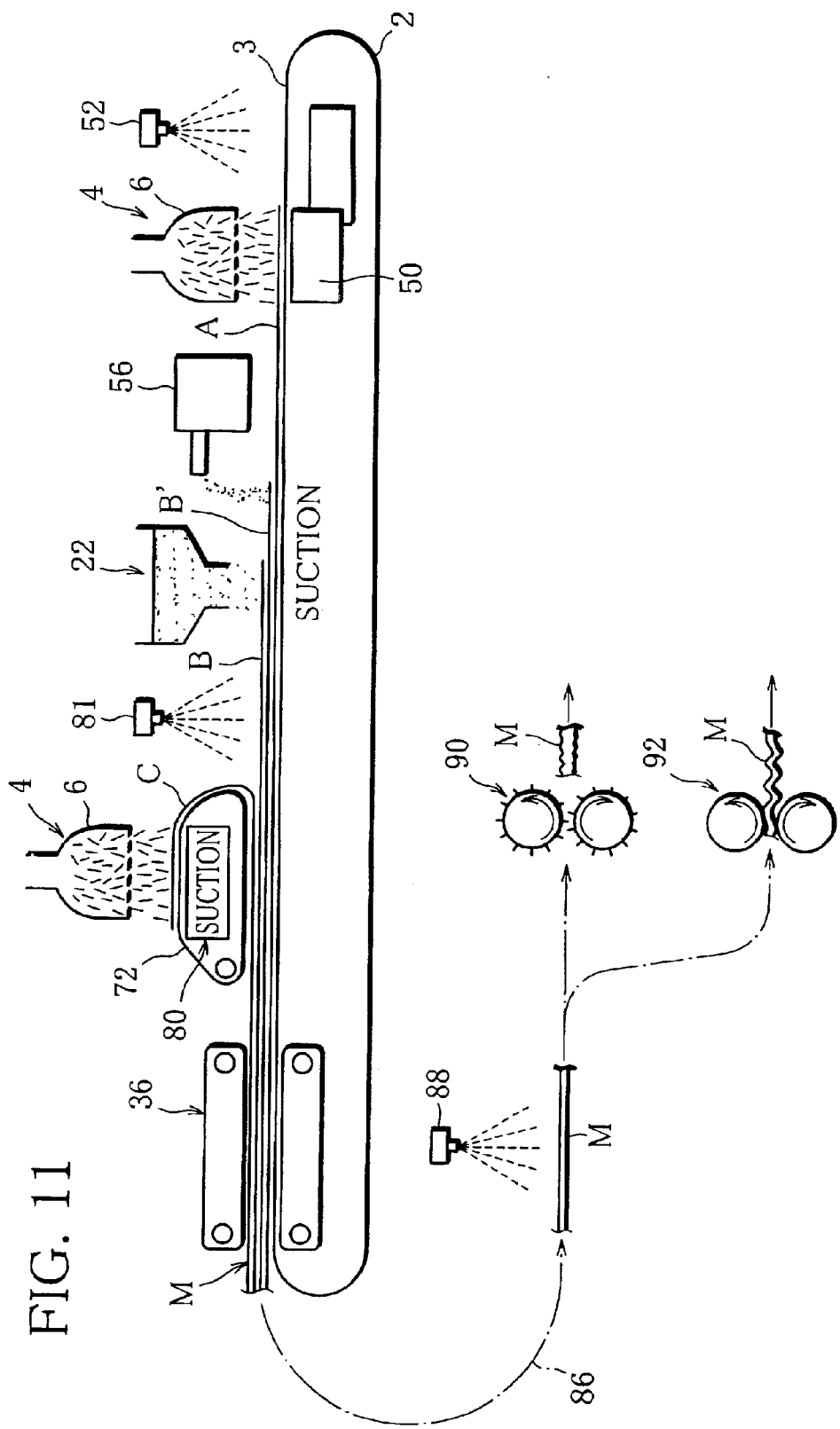
FIG. 11 is a schematic view showing a manufacturing system according to a third embodiment.

FIG. 11 shows a manufacturing system according to a third embodiment for carrying out a sheet tobacco manufacturing process.

In the manufacturing system of FIG. 11, the net surface 3 of the net conveyor 2 extends through the pressing device 36. Inside the net conveyor 2 is arranged a suction box 50 at a location under the upstream-side layer deposition device 4. Also, to permit satisfactory deposition of pulp, an array of spray nozzles 52 is arranged above the net conveyor 2 on an upstream side of the layer deposition device 4, that is, the fiber spreading unit 6 thereof. The spray nozzles 52 spray water on the net surface 3.

Figure 12:
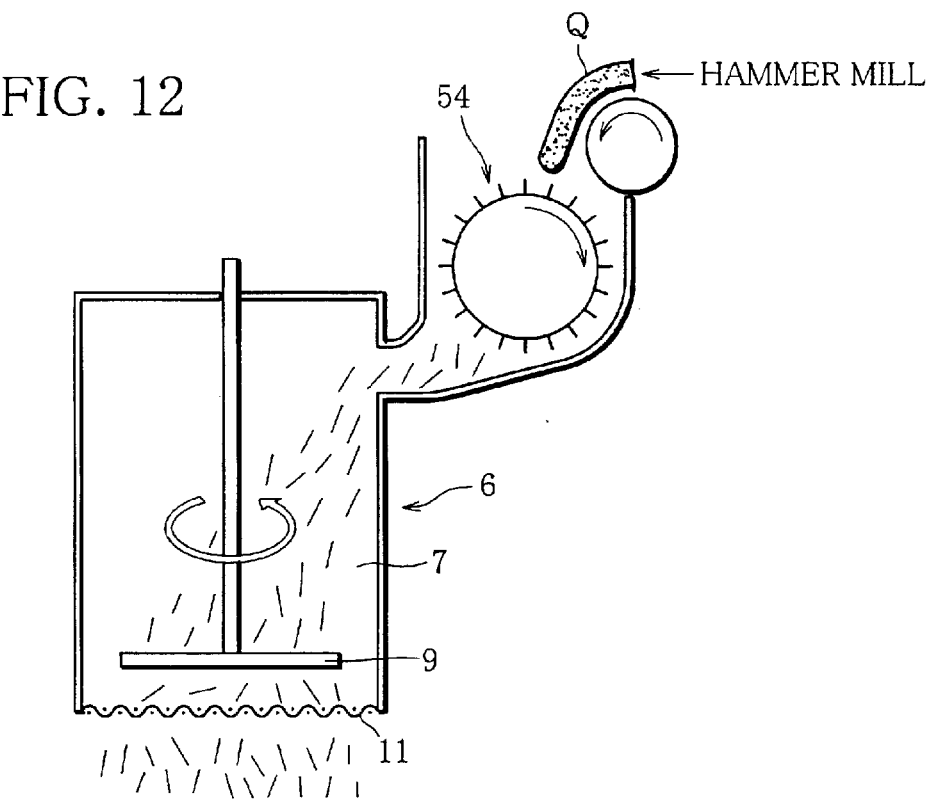
FIG. 12 is an enlarged view showing part of an upstream-side layer deposition device appearing in FIG. 11.

As shown in FIG. 12, the chamber 7 of the upstream-side fiber spreading unit 6 is directly connected to an opening device 54 of drum type, which in turn is connected to a hammer mill through a pneumatic feed pipe (not shown). Pulp Q coarsely crushed by the hammer mill is transported through the pneumatic feed pipe to the opening device 54. The opening device 54 reduces the pulp Q to separate fibers and supplies the fibers to the chamber 7 of the fiber spreading unit 6. Since the opening device 54 is arranged close to the fiber spreading unit 6, a fixed quantity of fibers can be constantly supplied from the opening device 54 to the chamber 7. This enables the fiber spreading unit 6 to form the carrier sheet A with higher accuracy on the net surface 3 of the net conveyor 2.

A feeder unit 56 is arranged above the net conveyor 2 at a location between the upstream-side fiber spreading unit 6 and the powder spreading unit 22. The feeder unit 56 spreads particles of stems and laminas of tobacco, etc. over the carrier sheet A, to form a tobacco particle layer B' on the carrier sheet A.

Figure 13:
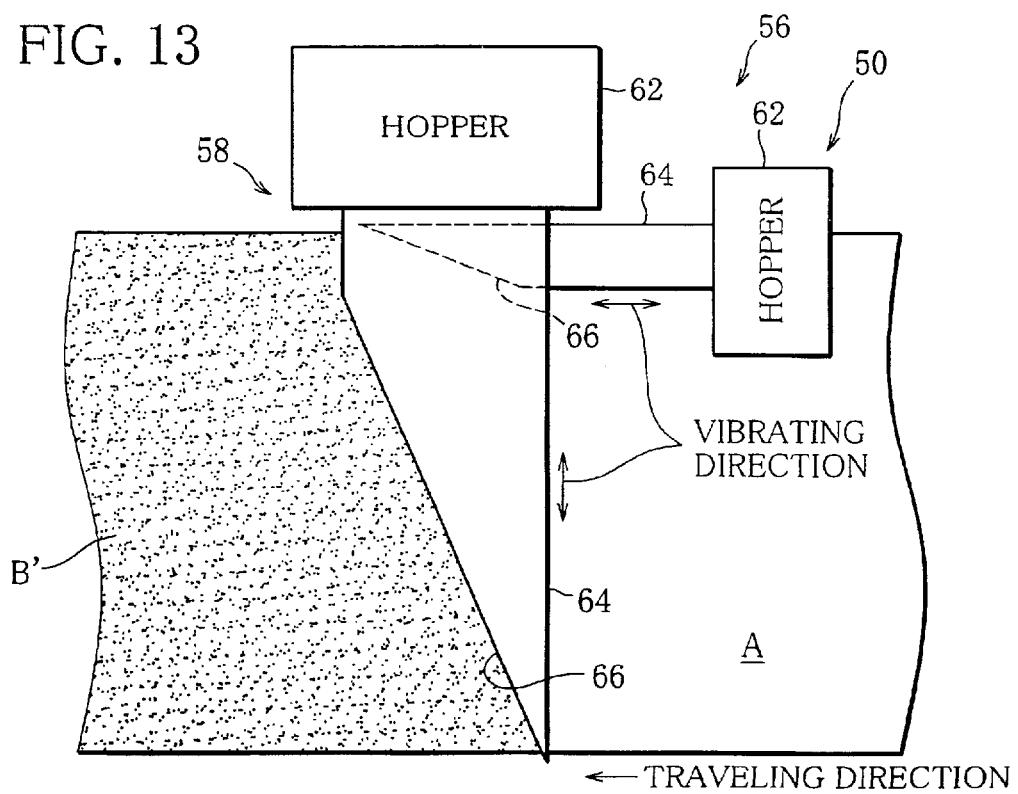
FIG. 13 is an enlarged plan view of a vibrating feeder appearing in FIG. 11.

As shown in FIG. 13, the feeder unit 56 includes a main vibrating feeder 58 and a sub vibrating feeder 60. Each vibrating feeder is provided with a hopper 62 storing a mixture of particles of tobacco stems and laminas, etc. A flat pipe-shaped delivery guide 64 extends from each hopper 62 and has an oblique open edge 66 at a distal end thereof. The delivery guides 64 vibrate in respective directions indicated by the arrows in the figure, to deliver the mixtures in the corresponding hoppers 62 in their vibrating directions. The mixtures delivered in this manner are spread uniformly on the carrier sheet A from the entire lengths of the open edges 66 of the delivery guides 64. As is clear from FIG. 13, the vibrating feeders 58 and 60 together have a mixture spreading region covering the entire width of the carrier sheet A, whereby the particle layer B' of the mixture can be uniformly formed over the carrier sheet A.

In cases where the open edge 66 of the main feeder 58 has a length covering the entire width of the carrier sheet A, the feeder unit 56 may include only the main vibrating feeder 58. Also, the feeder unit 56 may be arranged between the powder spreading device 22 and the spray nozzle array 34.

Figure 14:
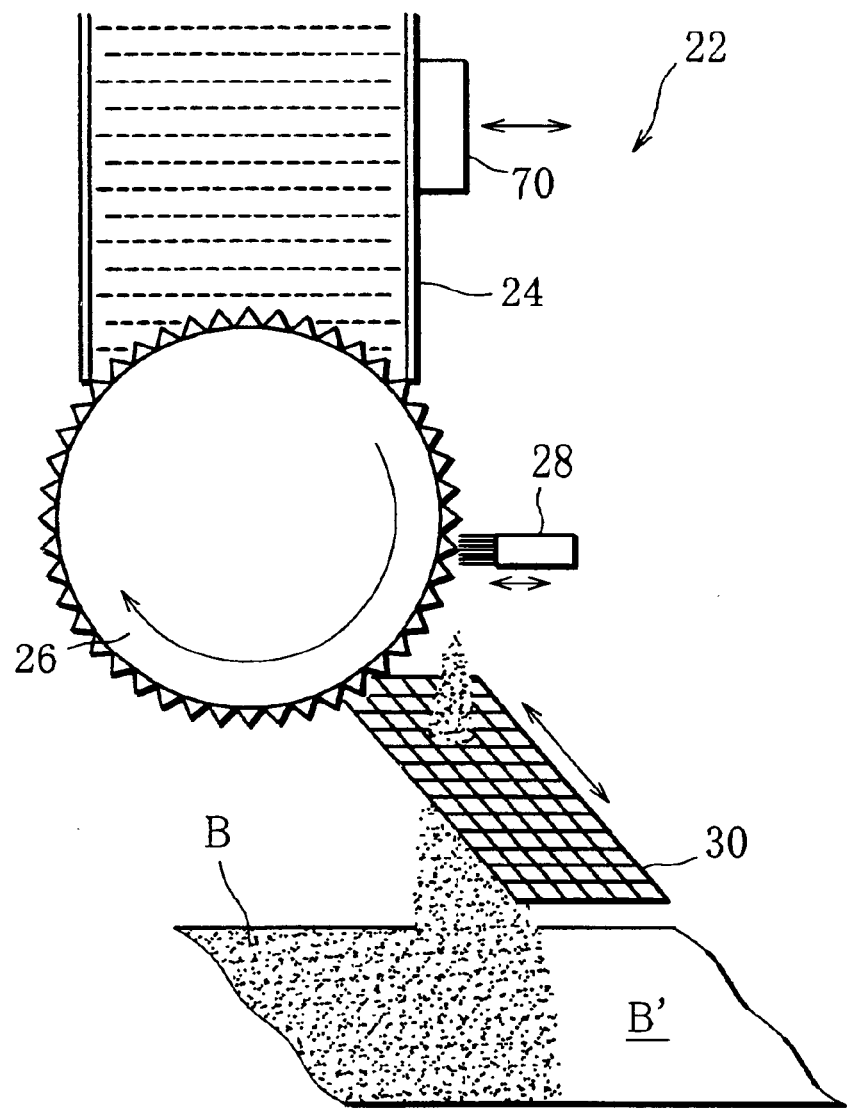
FIG. 14 is a side view of a powder spreading device appearing in FIG. 11.

In the third embodiment, the powder spreading device 22 has a vibrator 70, as shown in FIG. 14, and the vibrator 70 vibrates the hopper 24 to allow the powder mixture to be retained on the roll 26 without fail.

The powder spreading device 22 forms a tobacco powder layer B on the particle layer B'. Subsequently, the spray nozzle array 34 sprays water W uniformly over the tobacco powder layer B, so that the water W infiltrates into the particle layer B' and the carrier sheet A through the tobacco powder layer B.

Figure 15:
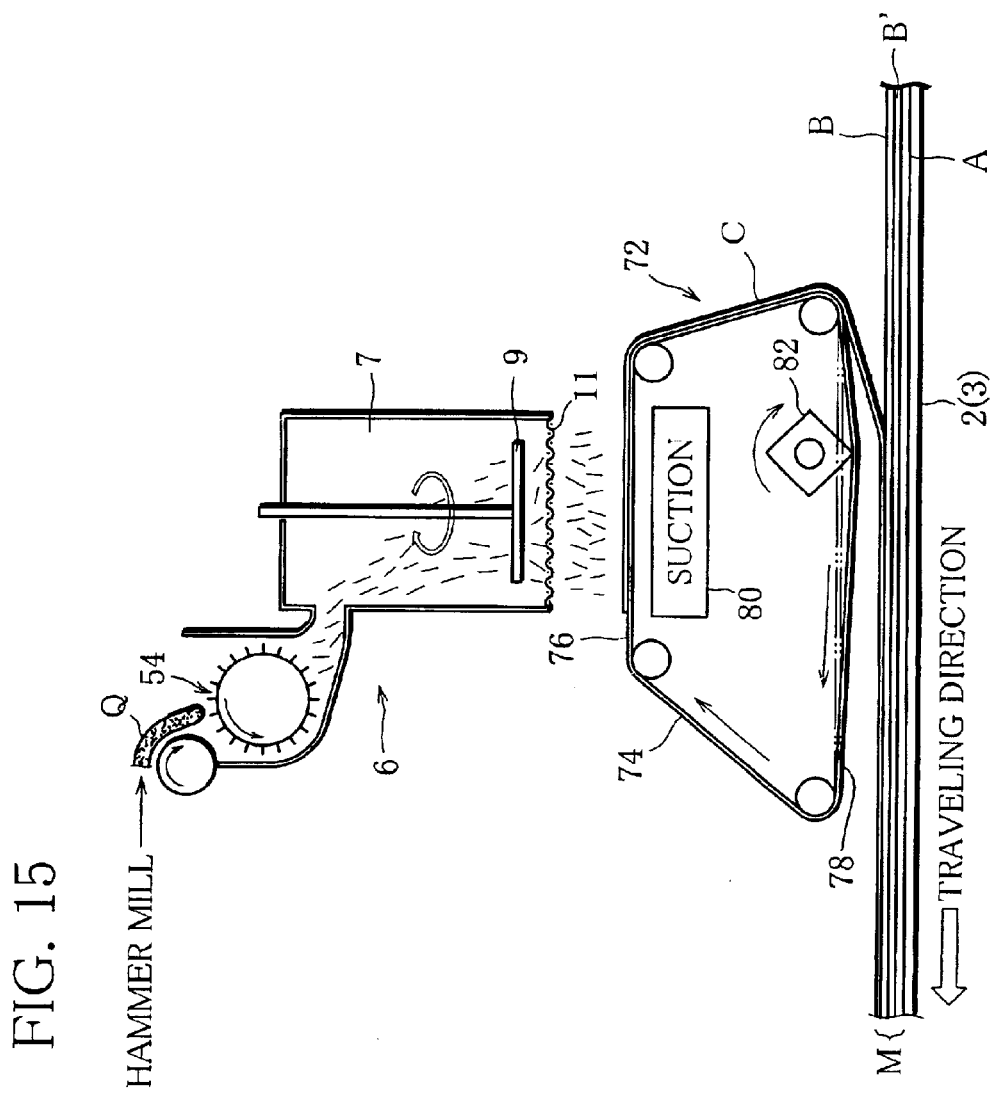
FIG. 15 is an enlarged view of a downstream-side layer deposition device appearing in FIG. 11.

As shown in FIG. 15, the downstream-side layer deposition device 4 includes a fiber spreading unit similar to the unit 6 shown in FIG. 12, and a transfer unit 72. The transfer unit 72 is arranged between the net conveyor 2 and the fiber spreading unit 6 and has an endless mesh conveyor 74 similar to the net conveyor 2. The mesh conveyor 74 has a mesh surface 76 facing the fine mesh screen 11 of the fiber spreading unit 6, and a mesh surface 78 facing the net conveyor 2, that is, the net surface 3. The mesh conveyor 74 travels in a direction opposite to that of the net conveyor 2 at the same speed as the net conveyor 2. Accordingly, the mesh surface 78 of the mesh conveyor 74 moves in the same direction and at the same speed as the net surface 3.

A suction box 80 is arranged inside the mesh conveyor 74 along the mesh surface 76 and produces a predetermined suction force acting upon the mesh surface 76. Accordingly, the plant fibers spread from the fiber spreading unit 6 form a cover sheet C on the mesh surface 76, and the cover sheet C is transported together with the mesh conveyor 74.

Inside the mesh conveyor 74 is also arranged a rotating rod 82 in the vicinity of the mesh surface 78. More specifically, the rotating rod 82 is a square rod located at an upstream portion of the mesh surface 78. When rotated, the rotating rod 82 periodically taps on the mesh surface 78 to vibrate the same, whereby the cover sheet C transported from the mesh surface 76 is shaken off toward the net surface 3 and is lapped over the tobacco powder layer B.

Figure 16:
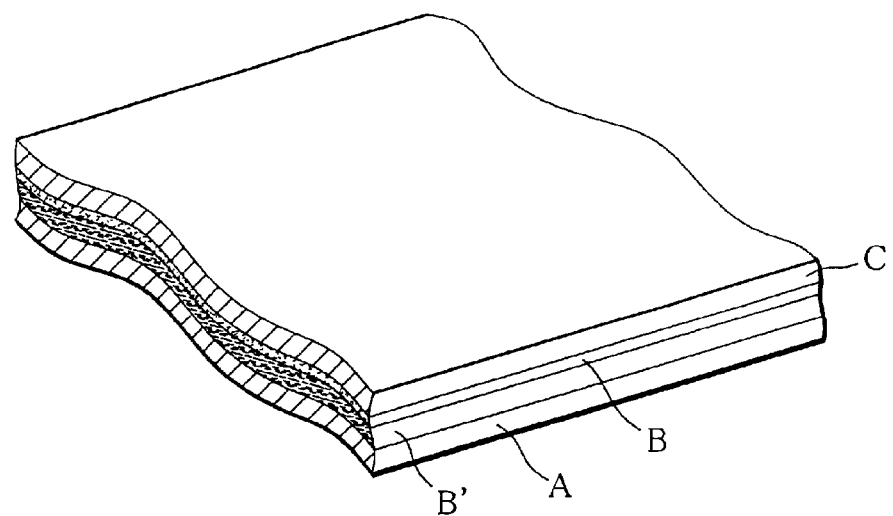
FIG. 16 is a partly broken perspective view of produced sheet tobacco having a four-layer structure.

Thus, after the net surface 3 passes under the downstream-side layer deposition device 4, a four-layer mat M having the particle layer B', the tobacco powder layer B and the cover sheet C successively formed on the carrier sheet A, as shown in FIG. 16, is formed on the net surface 3.

An array of spray nozzles 81 is arranged on an upstream side of the transfer unit 72 and sprays water so that the water may be infiltrated into the carrier sheet A through the tobacco powder layer B and the particle layer B'.

Figure 17:
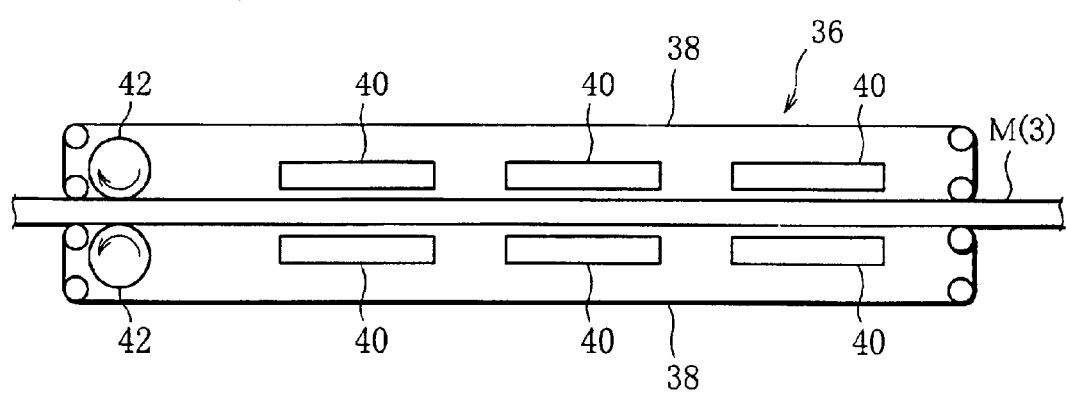
FIG. 17 is an enlarged view of a pressing device appearing in FIG. 11.

The mat M then passes through the aforementioned pressing device 36 to be subjected to heating and pressing. As shown in FIG. 17, the pressing device 36 of the third embodiment has upper and lower heat-resistant belt conveyors 38, which hold the mat M and the net surface 3 therebetween and cause the mat M to travel in cooperation with the net surface 3. The pressing device 36 has a plurality of heaters 40 arranged inside the individual belt conveyors 38 along the net surface 3.

After passing through the pressing device 36, the mat M transfers from the net conveyor 2 to another conveyor 86, as shown in FIG. 11, and is transported by the conveyor 86. An array of spray nozzles 88 is arranged above the conveyor 86 for spraying water W on the mat M, so that the water content of the mat M can be adjusted as required.

The conveyor 86 may be passed through either an embossing device 90 or a rippling device 92 on a downstream side of a dryer (not shown), to subject the mat M to embossing or rippling.

Compared with the manufacturing processes and systems according to the first and second embodiments, the manufacturing process and system of the third embodiment additionally provide the following advantages:

a) Prior to the formation of the carrier sheet A on the net conveyor 2, that is, on the net surface 3, the net surface 3 is sprayed with water W from the spray nozzle array 52 and thus is in a wet state. Accordingly, when pulp is deposited in layer form, it does not slip on the net conveyor 2 and forms a layer satisfactorily.

b) The mat M includes, besides the tobacco powder layer B, the particle layer B' containing particles of tobacco stems and laminas, etc. This makes it possible to manufacture sheet tobacco having an even higher expansion coefficient.

c) The cover sheet C is first formed on the mesh conveyor 74 of the transfer unit 72 and then is transferred to be lapped over the tobacco powder layer B. This method of transferring the cover sheet C can prevent the disadvantage of directly depositing pulp to form the cover sheet C on the carrier sheet A with the tobacco powder layer B and the particle layer B' therebetween, namely, the disadvantage that the powder materials of the tobacco powder layer and the particle layer are sucked into the carrier sheet A when the pulp layer is formed. Also, since the transfer unit 72 is provided with the rotating rod 82, the cover sheet C can be peeled from the mesh conveyor 74 without fail to be transferred onto the tobacco powder layer B.

It is to be understood that the present invention is not limited to the embodiments described above, and that various changes and modifications may be effected therein by one skilled in the art without departing from the scope or spirit of the invention.

What is claimed is:

1. Sheet tobacco comprising:

a tobacco powder layer containing a tobacco powder material and a binder; and a carrier layer covering one side of said tobacco powder layer and made of nonwoven plant fibers wherein the binder binds together the tobacco powder material in the tobacco layer and the nonwoven plant fibers in the carrier layer by infiltration into the carrier layer.

2. The sheet tobacco according to claim 1, further comprising a cover layer covering the other side of said tobacco powder layer and made of nonwoven plant fibers.

3. The sheet tobacco according to claim 2, wherein said tobacco powder layer has a basis weight of 30 to 200 g/m$^2$, and said carrier layer and said cover layer each have a basis weight of 3 to 50 g/m$^2$.

4. The sheet tobacco according to claim 2, wherein the binder is used to bind the tobacco powder material and also to bind together the plant fibers of at least one of said carrier layer and said cover layer.

5. The sheet tobacco according to claim 2, further comprising a tobacco particle layer sandwiched between said tobacco powder layer and said carrier layer or between said cover layer and said tobacco powder layer, said tobacco particle layer containing particles of tobacco stems and laminas.

6. The sheet tobacco according to claim 2, wherein the binder binds together the nonwoven plant fibers in the cover layer by infiltration into the cover layer.

7. The sheet tobacco according to claim 2, wherein the binder binds the tobacco powder layer to the carrier layer and to the cover layer.

8. The sheet tobacco according to claim 1, wherein said tobacco powder layer has a binder content of not greater than 15% by weight with respect to the tobacco powder material.

9. The sheet tobacco according to claim 1, wherein the binder contains cornstarch.

10. Sheet tobacco comprising:

a carrier layer made of nonwoven fabric, the nonwoven fabric including plant fibers; and a tobacco powder layer covering one side of said carrier layer, said tobacco powder layer containing a tobacco powder material and a binder for binding together the plant fibers in the nonwoven fabric and the tobacco powder material in the tobacco powder layer.

* * * * *